(12) United States Patent
Takubo et al.

(10) Patent No.: US 12,417,009 B2
(45) Date of Patent: Sep. 16, 2025

(54) DISPLAY CONTROL DEVICE FOR MANAGING DISPLAY OF OBJECTS ON A SCREEN, DISPLAY CONTROL METHOD AND PROGRAM

(71) Applicant: RAKUTEN GROUP, INC., Tokyo (JP)

(72) Inventors: Naoko Takubo, Tokyo (JP); Suehyun Kim, Tokyo (JP); Reiko Inoue, Tokyo (JP)

(73) Assignee: RAKUTEN GROUP, INC., Tokyo (JP)

( * ) Notice: Subject to any disclaimer, the term of this patent is extended or adjusted under 35 U.S.C. 154(b) by 158 days.

(21) Appl. No.: 17/758,303

(22) PCT Filed: Jan. 5, 2021

(86) PCT No.: PCT/JP2021/000087
§ 371 (c)(1),
(2) Date: Jul. 1, 2022

(87) PCT Pub. No.: WO2022/149185
PCT Pub. Date: Jul. 14, 2022

(65) Prior Publication Data
US 2023/0342007 A1   Oct. 26, 2023

(51) Int. Cl.
*G06F 3/0484* (2022.01)
*G06F 3/0482* (2013.01)

(52) U.S. Cl.
CPC .......... *G06F 3/0484* (2013.01); *G06F 3/0482* (2013.01)

(58) Field of Classification Search
None
See application file for complete search history.

(56) References Cited

U.S. PATENT DOCUMENTS

| | | | |
|---|---|---|---|
| 6,983,424 B1 | 1/2006 | Dutta | |
| 11,916,861 B2 * | 2/2024 | Shepherd | G06F 3/0482 |
| 2005/0216862 A1 | 9/2005 | Shinohara et al. | |
| 2006/0041629 A1 * | 2/2006 | Lira | H04L 12/1827 |
| | | | 709/206 |
| 2008/0072172 A1 | 3/2008 | Shinohara et al. | |

(Continued)

FOREIGN PATENT DOCUMENTS

| | | |
|---|---|---|
| CN | 111580906 A | 8/2020 |
| JP | 2005301992 A | 10/2005 |

(Continued)

OTHER PUBLICATIONS

International Search Report of Mar. 30, 2021, for International Patent Application PCT/JP2021/000087 pp. 1-9.

(Continued)

*Primary Examiner* — Henry Orr
(74) *Attorney, Agent, or Firm* — HEA LAW PLLC

(57) ABSTRACT

At least one processor of a display control device displays at least one object on a display screen. The at least one processor determines, when the at least one object is displayed, whether a predetermined time period has elapsed. The at least one processor changes, when it is determined that the predetermined time period has elapsed, at least one of a display mode or a display position of the at least one object.

14 Claims, 12 Drawing Sheets

(56) References Cited

U.S. PATENT DOCUMENTS

| | | | |
|---|---|---|---|
| 2011/0167383 A1* | 7/2011 | Schuller | G06F 9/451 |
| | | | 455/566 |
| 2015/0350147 A1* | 12/2015 | Shepherd | H04L 51/10 |
| | | | 715/752 |
| 2017/0054670 A1* | 2/2017 | Lee | H04M 1/72436 |
| 2017/0060359 A1* | 3/2017 | Chaudhri | G06F 9/451 |
| 2018/0181999 A1 | 6/2018 | Kim et al. | |
| 2018/0335920 A1* | 11/2018 | Tyler | G06F 3/04817 |
| 2019/0342519 A1* | 11/2019 | Van Os | H04N 7/152 |
| 2021/0250311 A1* | 8/2021 | Luo | H04L 51/42 |
| 2022/0094657 A1* | 3/2022 | Brooks Powell | H04L 51/224 |

FOREIGN PATENT DOCUMENTS

| | | |
|---|---|---|
| JP | 2006244187 A | 9/2006 |
| JP | 2007172576 A | 7/2007 |
| JP | 2018155960 A | 10/2018 |
| JP | 2020502696 A | 1/2020 |

OTHER PUBLICATIONS

Office Action of Feb. 7, 2023, for corresponding JP Patent Application No. 2022-083971 with partial English translation pp. 1-4.
Office Action of Sep. 30, 2022, for corresponding TW Patent Application No. 111100188 pp. 1-10.

* cited by examiner

DISPLAY CONTROL DEVICE FOR MANAGING DISPLAY OF OBJECTS ON A SCREEN, DISPLAY CONTROL METHOD AND PROGRAM

CROSS REFERENCE TO RELATED APPLICATIONS

This application is a National Stage of International Application No. PCT/JP2021/000087 filed on Jan. 5, 2021. The contents of the above document is incorporated herein by reference in its entirety.

TECHNICAL FIELD

The present disclosure relates to a display control device, a display control method, and a program.

BACKGROUND ART

Hitherto, there has been a demand for a user interface that is highly convenient for a user. For example, it is described in Patent Literature 1 that, when a user moves to a predetermined place with a mobile phone, the mobile phone of the user displays information available at that place, and after a predetermined time period has elapsed since the user moved to that place, the information displayed on a display screen is erased.

CITATION LIST

Patent Literature

[PTL 1] JP 2006-244187 A

SUMMARY OF INVENTION

Technical Problem

However, as in Patent Literature 1, when the information on a display screen is erased after a predetermined time period has elapsed, a space in which the information has been displayed can be used for another purpose, but it becomes impossible to check any information that has been displayed until then, and hence convenience of a user is lowered.

An object of the present disclosure is to provide a highly convenient user interface.

Solution to Problem

According to one aspect of the present disclosure, there is provided a display control device including: display control means for displaying at least one object on a display screen; determination means for determining, when the at least one object is displayed, whether a predetermined time period has elapsed; and display changing means for changing, when it is determined that the predetermined time period has elapsed, at least one of a display mode or a display position of the at least one object.

Advantageous Effects of Invention

According to the present disclosure, the highly convenient user interface can be provided.

DESCRIPTION OF EMBODIMENTS

1. First Embodiment

Now, an example of a display control device according to a first embodiment of the present disclosure is described. In the first embodiment, a display control system including a user terminal being an example of the display control device is described.

[1-1. Overall Configuration of Display Control System]

Figure 1:
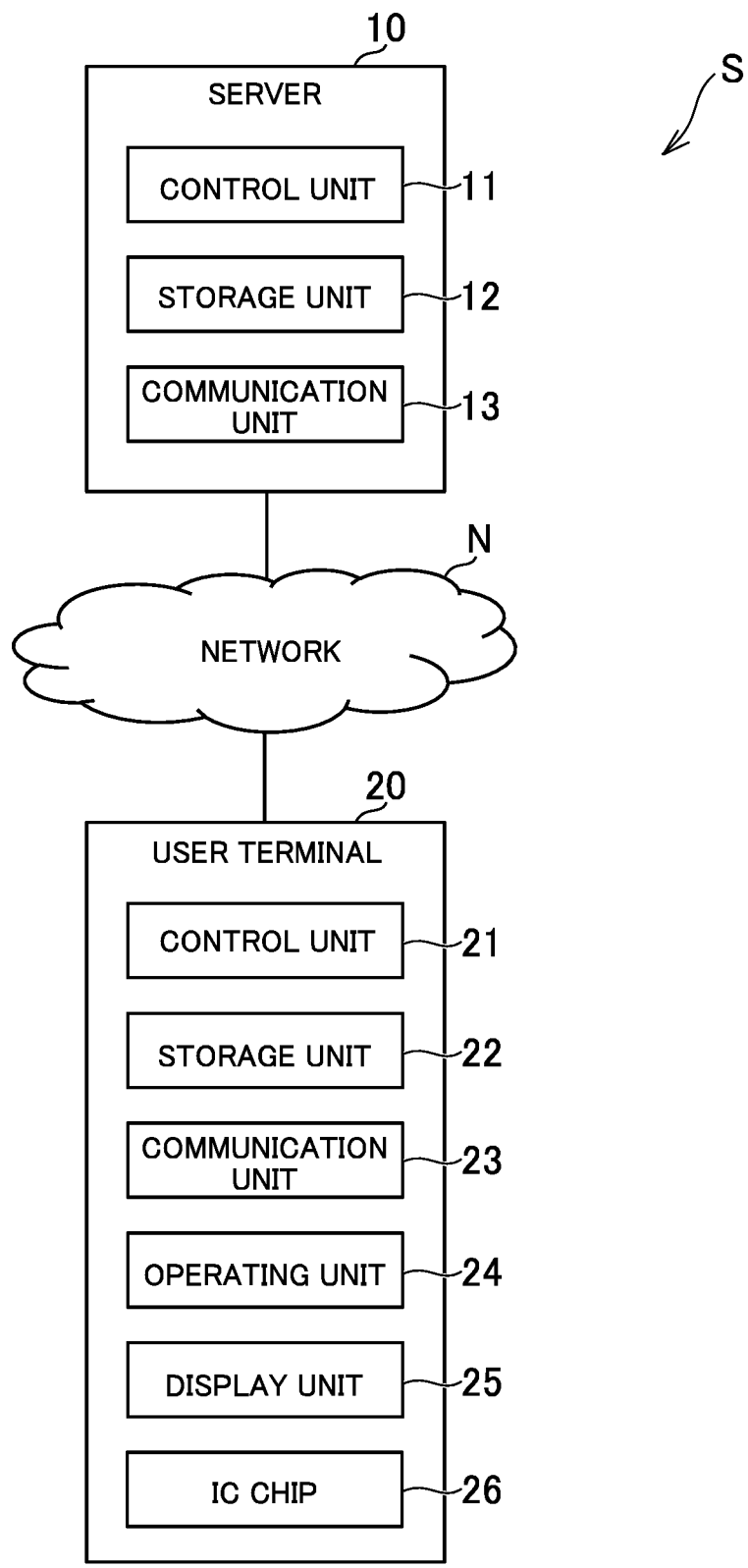
FIG. 1 is a diagram for illustrating an example of an overall configuration of a display control system.

FIG. 1 is a diagram for illustrating an example of an overall configuration of the display control system. As illustrated in FIG. 1, a display control system S includes a server 10 and a user terminal 20. Each of the server 10 and the user terminal 20 can be connected to a network N such as the Internet. In FIG. 1, one server 10 and one user terminal are illustrated, but there may be a plurality of servers and a plurality of user terminals 20.

The server 10 is a server computer. The server 10 includes a control unit 11, a storage unit 12, and a communication unit 13. The control unit 11 includes at least one processor. The storage unit 12 includes a volatile memory such as a RAM, and a nonvolatile memory such as a hard disk drive. The communication unit 13 includes at least one of a communication interface for wired communication or a communication interface for wireless communication.

The user terminal 20 is a computer to be operated by a user. For example, the user terminal 20 is a smartphone, a tablet computer, a wearable terminal, or a personal computer. The user terminal 20 includes a control unit 21, a storage unit 22, a communication unit 23, an operating unit 24, a display unit 25, and an IC chip 26. Physical configurations of the control unit 21, the storage unit 22, and the communication unit 23 are the same as those of the control unit 11, the storage unit 12, and the communication unit 13, respectively.

The operating unit 24 is an input device such as a touch panel. The display unit 25 is a liquid crystal display or an organic EL display. The IC chip 26 may be a chip of any standards, such as a chip of FeliCa (trademark) or a chip of a so-called Type A or Type B among the non-contact type standards. The IC chip 26 includes hardware including an antenna conforming to the standards, and stores, for example, information required for a service to be used by a user.

At least one of programs or data stored in the storage units 12 and 22 may be supplied thereto via the network N. Further, each of the server 10 and the user terminal 20 may include at least one of a reading unit (e.g., an optical disc drive or a memory card slot) for reading a computer-readable information storage medium, or an input/output unit (e.g., a USB port) for inputting and outputting data to/from an external device. For example, at least one of the program or the data stored in the information storage medium may be supplied through intermediation of at least one of the reading unit or the input/output unit.

[1-2. Outline of First Embodiment]

In the first embodiment, processing of the display control system S is described by taking as an example a screen of an application for transmitting and receiving messages between users (hereinafter referred to simply as an "app"). The app has been downloaded and installed in the user terminal in advance. When a user completes registration for use of the app and adds a friend, the user becomes able to transmit and receive messages to/from the friend. When the user activates the app, a home screen of the app is displayed on the display unit 25.

Figure 2:
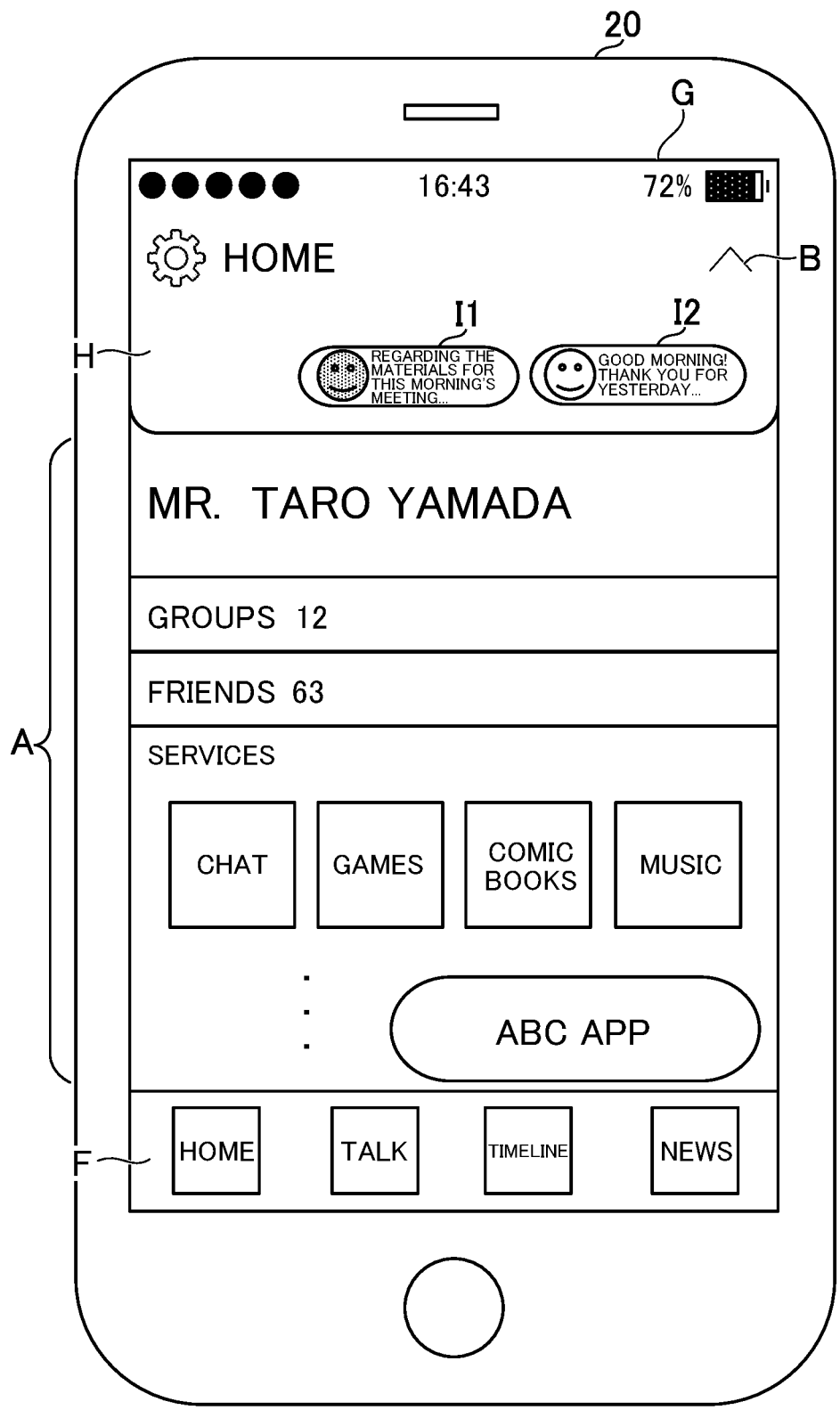
FIG. 2 is a view for illustrating an example of a home screen.

FIG. 2 is a view for illustrating an example of the home screen. As illustrated in FIG. 2, a home screen G includes a header region H being a region corresponding to a header, a footer region F being a region corresponding to a footer, and a display region A being a region for displaying content. The home screen G is a screen that receives a user operation, and thus corresponds to a user interface.

In the header region H, icons I1 and I2 indicating unread messages and a button B for expanding or contracting the header region H are displayed. The button B is displayed as an upward or downward mark so as to indicate a direction in which the header region H is expanded or contracted when the button B is selected. The icons I1 and I2 are hereinafter referred to simply as an "icon I" unless the icons I1 and I2 are distinguished from each other. The icon I includes an image indicating a sender of the unread message and text indicating a beginning of the unread message.

When the user selects the icon I, the unread message corresponding to the selected icon I is displayed on the display unit 25. In the first embodiment, after a predetermined time period has elapsed since the home screen G was displayed, the header region H is contracted, and the icon I becomes smaller while moving. This time period can be said to be the time period for allowing the user to check information included in the icon I, and hence this time period is hereinafter referred to as a "checking time period."

Figure 3:
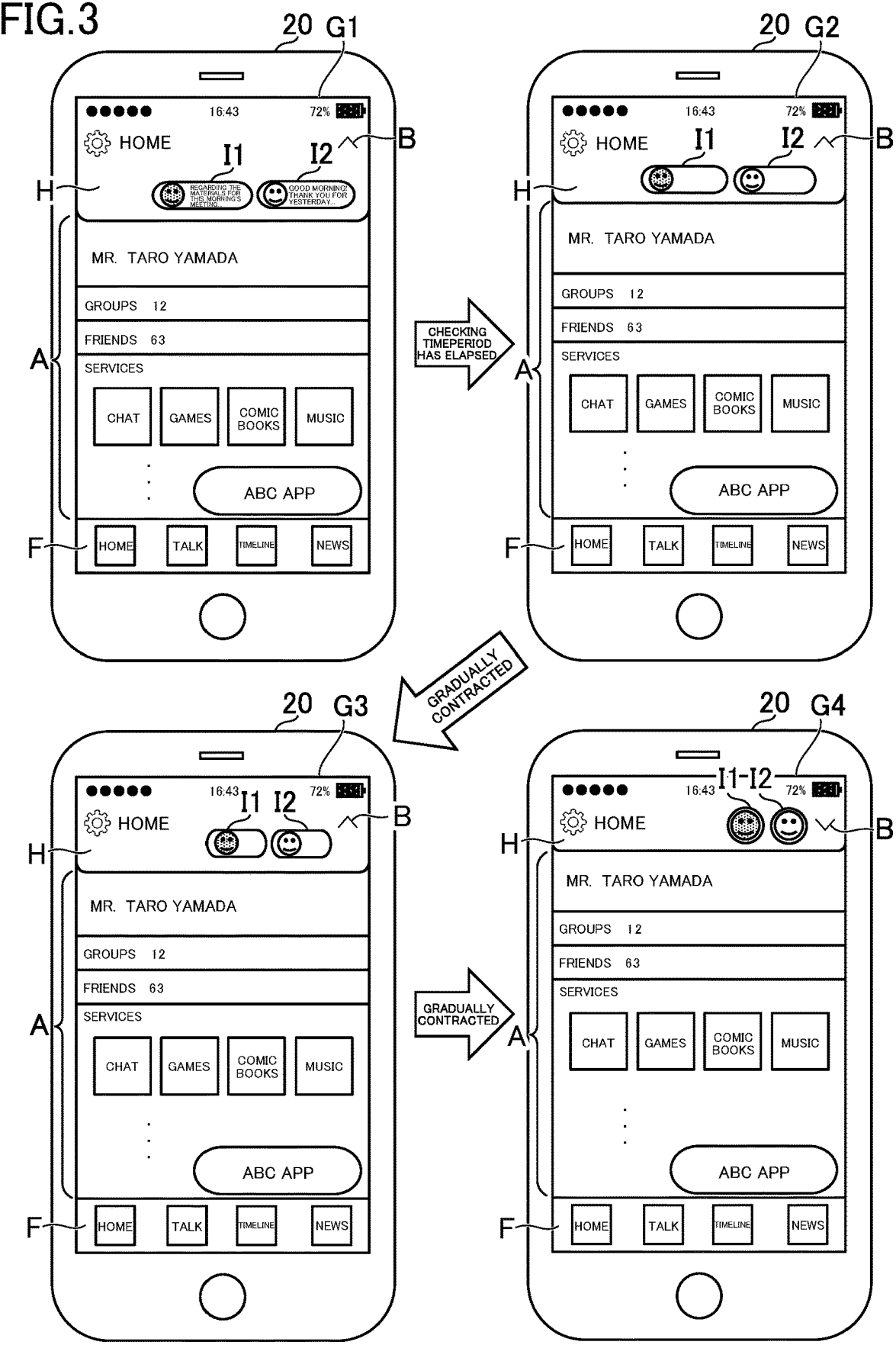
FIG. 3 is a view for illustrating an example of how the home screen is changed in a first embodiment of the present disclosure.

FIG. 3 is a view for illustrating an example of how the home screen G is changed in the first embodiment. As illustrated in FIG. 3, both the display of the header region H and the display of the icon I are not changed until the checking time period has elapsed (state of a home screen G1). When the checking time period has elapsed, the header region H begins to be contracted upward, and the icon I also starts to move upward (state of a home screen G2). The header region H being contracted upward means the header region H having a lower end moving upward.

In the first embodiment, a case in which, as in the state of the home screen G2, text in the icon I disappears and the icon I gradually becomes smaller after the icon I starts to move is described, but the text in the icon I may disappear gradually instead of disappearing instantaneously, or may remain as it is until the icon I has moved and become smaller to some extent.

As the time period elapses, the header region H is gradually contracted upward, and the icon I gradually moves upward and becomes smaller (state of a home screen G3). When the header region H has been contracted to a predetermined size, the header region H is not contracted any further (state of a home screen G4). At the same time or substantially the same time as a time point at which the header region H stops being contracted, the icon I stops without moving any further, and becomes circular without any further change in size as well. The phrase "substantially the same time" means that a time difference is smaller than a predetermined value (for example, one second). When the state of the home screen G4 is reached, the display of the button B is changed so as to indicate a downward direction. It is assumed that an operation performed when the icon I is selected is not changed even when the icon I has become circular.

A time period after the checking time period elapsed until, for example, reduction of the header region H is completed (time period for executing an animation) may have any length, and may be, for example, about 0.2 second to about 1 second in length. The footer region F is not changed in size even when the header region H is contracted, but the display region A becomes wider by an amount by which the header region H has been contracted. The display region A is expanded upward as a whole, and hence a portion that has not been displayed until then is also displayed in a lower part of the display region A.

For example, when the user selects the button B under the state of the home screen G4, the contracted header region H is expanded to return to the state of the home screen G1. In the first embodiment, a case in which the state of the home screen gradually returns from the state of the home screen G4 to the state of the home screen G1 by an animation reverse to that of FIG. 3 is described, but the state of the home screen may instantaneously return from the state of the home screen G4 to the state of the home screen G1.

Further, for example, when the user selects the button B under the state of the home screen G1, the state of the home screen G1 is gradually changed to the state of the home screen G4 without waiting until the checking time period has elapsed. In this case as well, the state of the home screen G1 may be instantaneously changed to the state of the home screen G4. As described above, in the display control system S, the animation is executed so that the header region H is gradually contracted and the icon I gradually becomes smaller while moving after the checking time period has elapsed. Such an animation enables the display control system S to effectively utilize a display space of the home screen G and to provide a highly convenient user interface for the user. This technology is described below in detail.

[1-3. Functions Implemented in First Embodiment]

Figure 4:
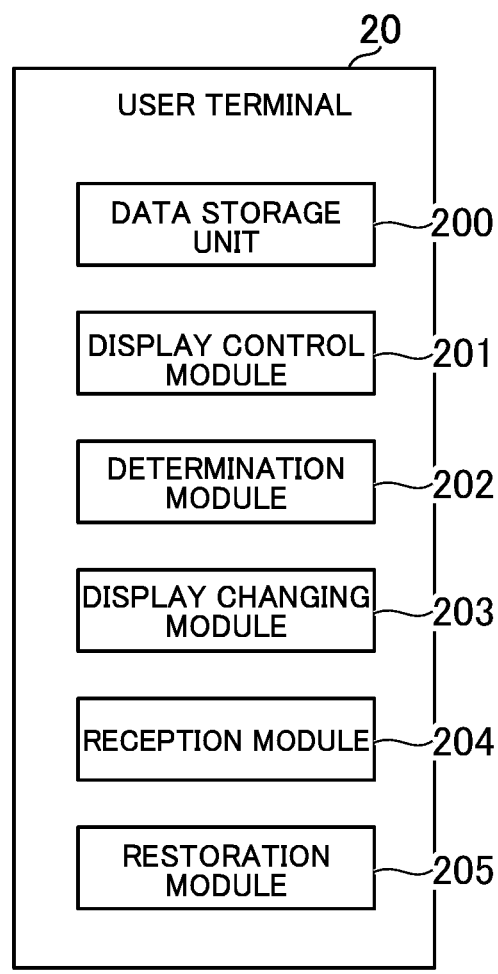
FIG. 4 is a functional block diagram for illustrating an example of functions implemented by the display control system in the first embodiment.

FIG. 4 is a functional block diagram for illustrating an example of functions implemented by the display control system S according to the first embodiment. In the first embodiment, a case in which main functions are implemented by the user terminal 20 is described. As illustrated in FIG. 4, on the user terminal 20, a data storage unit 200, a display control module 201, a determination module 202, a display changing module 203, a reception module 204, and a restoration module 205 are implemented. The data storage unit 200 is implemented mainly by the storage unit 22. Each of the other functions is mainly implemented by the control unit 21.

[Data Storage Unit]

The data storage unit 200 stores data required for displaying the home screen G. For example, the data storage unit 200 stores an app. In the first embodiment, a case in which a frame being a format of the entire home screen G is included as a part of the app and individual images in the frame are acquired from the server 10 is described, but all the images may be included as a part of the app and it may be possible to display the home screen G without communicating to/from the server 10.

The home screen G may also be displayed as a browser screen instead of an app screen. In this case, the data storage unit 200 may store a browser without storing the app. When some image for displaying the home screen G is required to be stored in the user terminal 20, the data storage unit 200 may store the image.

[Display Control Module]

The display control module 201 displays at least one icon I on the home screen G. The home screen G is an example of a display screen, and the icon I is an example of an object. Accordingly, the home screen G as used herein can be read as a "display screen," and the icon I as used herein can be read as an "object."

The display screen is a screen on which the object is displayed. A number of objects displayed on the display screen may be only one, or may be two or more. The display screen is not required to include the header region H. The display screen may be any screen, and may be, for example, a browser screen, a document file viewer screen, or a screen of another app other than a message app. Examples of the screen of another app are described in modification examples of the present disclosure.

Objects are components of the display screen. The object can also be said to be an image displayed on the display screen. The icon I displayed in the header region H is an example of the object, but it suffices that the object is visually recognizable. For example, the object may be an icon displayed outside the header region H. In addition, for example, the object may be a part of an image, text, a number, a graphic form, a box, a table, a button, a pattern, or a combination thereof. The object is not required to be an image to be operated, and may be an image displayed as a result of some processing.

In the first embodiment, the header region H is present on the home screen G, and hence the display control module 201 displays at least one icon I in a part of the predetermined header region H on the home screen G. The phrase "displaying the icon I in a part of the header region H" means that the header region H includes the icon I. That is, coordinates indicating a position of the icon I are included in the header region H. The header region H includes the entire outline of the icon I, but a part of an outline of the icon I may extend off the header region H.

The header region H is an example of a display region. Accordingly, the header region H as used herein can be read as a "display region." The display region is a region of all or a part of the home screen G. A size, a shape, and a position of the display region may be defined in advance, and may be any size, any shape, and any position. For example, the display region may be the footer region F. In addition, for example, the display region may be a bar arranged on a right side or a left side of the home screen G. The display region is not required to include an end portion of the home screen G, and may be present at a position spaced apart from the end portion of the home screen G.

The icon I may be displayed through use of the entire header region H, but in the first embodiment, the display control module 201 displays at least one icon I in a part of the header region H. Accordingly, the header region H has a region that is not occupied by the icon I. The icon I is at an upper level than that of the header region H, but the header region H has an exposed region that is not hidden by the icon I.

The position of the icon I is not particularly defined, and may be dynamically changed, but the position of the icon I at a time point at which the app is activated is defined in advance. Accordingly, the display control module 201 displays at least one icon I at a predetermined position in the header region H. When there are two or more icons I, the positions of the individual icons I are defined in advance. It is assumed that the positions of the icons exhibited when the app is activated are defined by the app.

[Determination Module]

The determination module 202 determines whether or not the checking time period has elapsed when at least one icon I is displayed. The checking time period may be any length, and may be, for example, about 1 second to about 5 seconds or about 10 seconds. In the first embodiment, a case in which the checking time period has a fixed value is described, but the checking time period may have a variable value. For example, the user may designate the checking time period, or the checking time period may be dynamically decided depending on a use status of the app. The checking time period may vary depending on the user. It is assumed that a numerical value indicating the checking time period is stored in the data storage unit 200 as a setting of the app.

The determination module 202 uses, for example, a real-time clock to count the time, and determines whether or not a time point later than a reference time point by the checking time period has been reached. The reference time point is a time point to start time counting. It is defined in the app which time point corresponds to the reference time point. For example, the reference time point is a time point at which a code for starting time counting is executed. As another example, the reference time point is a time point at which a code for displaying the home screen G is executed. As still another example, the reference time point is a time point at which the app is started. A time point before a time point at which the icon I actually appears on the home screen G may be set as the reference time point, or a time point thereafter may be set as the reference time point.

[Display Changing Module]

The display changing module 203 changes at least one of a display mode or a display position of at least one icon I when it is determined that the checking time period has elapsed. In this embodiment, a case in which both the display mode and the display position are changed is described, but only one of the display mode and the display position may be changed. The determination that the checking time period has elapsed is used as a condition (trigger) for changing at least one of the display mode or the display position.

The display mode refers to how the icon I appears (outer appearance or aesthetic appearance thereof). For example, the display mode is at least one of a shape, a size, or a color of the icon I. As another example, the display mode may be at least one of a brightness, a transparency, a pattern, a font, an orientation, an angle, or an effect of the icon I.

The display position refers to the position of the icon I on the home screen G. The display position is coordinates of the icon in a screen coordinate system (for example, two-dimensional coordinate system with the upper left of the home screen G being set as the origin). The changing of the display position is synonymous with moving.

For example, when it is determined that the checking time period has elapsed, the display changing module 203 changes the display mode so that at least one icon I becomes smaller. The icon I becoming smaller means the icon I having the area becoming smaller. For example, the icon I having at least one of the vertical width or the horizontal width becoming smaller corresponds to the icon I becoming smaller. The icon I having the area becoming smaller as a whole while one of the vertical width and the horizontal width becomes longer but the other becomes shorter corresponds to the icon I becoming smaller. The icon I is intentionally caused to remain instead of completely disappearing from the home screen G.

In the example of FIG. 3, the icon I gradually becomes smaller, but the display changing module 203 may instantaneously reduce the icon I. When the display changing module 203 gradually reduces the icon I, it is assumed that data on an animation indicating the reduction process is included as a part of the app. The display changing module 203 gradually reduces the icon I by reproducing the animation defined in this data. When the icon I is to be instantaneously reduced, the display changing module 203 may display the icon I of a second size smaller than a first size instead of displaying the icon I of the first size. A reduction amount (decrease amount of the area) of the icon I may have a fixed value or a variable value.

For example, when it is determined that the checking time period has elapsed, the display changing module 203 changes the display mode so that an information amount of at least one icon I is reduced. The information amount is how much information is indicated by the icon I, for example, an amount of at least one of text, a number, or another symbol in the icon I. For example, a number of characters or a number of digits included in the icon I corresponds to the information amount. In addition, for example, the number of images in the icon I corresponds to the information amount.

In the example of FIG. 3, the fact that the text in the icon I in the state of the home screen G1 disappears under the states of the home screens G2 to G4 corresponds to reduction of the information amount. The display changing module 203 reduces the information amount of the icon I by erasing the text in the icon I. The gradual decrease in text, rather than the instantaneous disappearance of the text, may correspond to the reduction of the information amount. In this case, the display changing module 203 may gradually reduce the information amount of the icon I by the animation. Even with some text remaining in the end, such reduction corresponds to the reduction of the information amount as long as the number of characters is reduced compared to the beginning.

For example, the at least one icon I includes a graphic form and a number or a character, and when it is determined that the checking time period has elapsed, the display changing module 203 changes the display mode so that the number or character included in the at least one icon I is erased and the graphic form remains. The graphic form means not only a geometric pattern but also an illustration or a photograph. The graphic form may be maintained as it is, but at least one of the shape, the size, or the position may be changed. In the example of FIG. 3, an image of a face of the sender corresponding to the graphic form becomes slightly larger in size.

In the first embodiment, not only the icon I but also the header region H is contracted, and hence when it is determined that the checking time period has elapsed, the display changing module 203 changes the header region H on the home screen G so that the header region H is contracted. The contraction of the header region H means the reduction of the area that appears on the home screen G. For example, shortening of at least one of the vertical width or the horizontal width of the header region H corresponds to the contraction of the header region H.

In addition, for example, the movement of the header region H toward the outside of the home screen G without changing the internal area of the header region H (not the apparent area but the area in the user terminal 20) corresponds to the contraction of the header region H. The header region H is intentionally caused to remain instead of completely disappearing from the home screen G. For example, the header region H is contracted so as to be able to secure a region to such an extent as to enable at least the icon I to be displayed.

In the example of FIG. 3, the header region H is gradually contracted, but the display changing module 203 may instantaneously contract the header region H. When the display changing module 203 gradually contracts the header region H, it is assumed that data on an animation indicating the contraction process is included as a part of the app. The display changing module 203 gradually contracts the header region H by reproducing the animation defined in this data. When the header region H is to be reduced instantaneously, the display changing module 203 may display the header region H of a second size smaller than a first size instead of displaying the header region H of the first size, or may move the header region H located at a first position to a second position located on an outer side of the home screen G than the first position.

When it is determined that the checking time period has elapsed, the display changing module 203 changes the header region H so that the header region H on the home screen G is contracted so as not to include a predetermined position (position at which the icon I has been displayed so far). In the example of FIG. 3, the display changing module 203 changes the header region H so that the display position of the icon I in the state of the home screen G1 falls out of the header region H under the state of the home screen G4.

The display changing module 203 changes the display position of the icon I so that at least one icon I moves in a direction in which the header region H is contracted and falls within the contracted header region H. In the example of FIG. 3, the header region H is contracted in an upward direction, and hence the display changing module 203 moves the icon I in the upward direction or a direction in which a deviation from the upward direction is smaller than a predetermined angle (for example, 45°). This deviation corresponds to an angle formed by the direction in which the header region H is contracted (direction in which the outline of the header region H moves) and a direction in which the icon I moves. The display changing module 203 changes the display position of the icon I so that the changed display position is included in the header region H that has been contracted. It is assumed that a position of the moving destination of the icon I is defined in the app in advance.

[Reception Module]

The reception module 204 receives an operation performed on the home screen G by the user. This operation may be an operation of any kind, for example, a tap, a flick, a long press, a click, or drag-and-drop. For example, the reception module 204 receives a selection operation for selecting the icon I or the button B in the header region H. The user terminal 20 executes processing corresponding to the operation performed by the user. A relationship between the operation and details of the processing is defined in the app.

[Restoration Module]

When a selection operation of the button B is performed after at least one of the display mode or the display position is changed by the display changing module 203, the restoration module 205 restores the changed at least one of the display mode or the display position. The selection operation of the button B is an example of a first operation. Accordingly, the selection operation of the button B as used herein can be read as "first operation." The first operation may be any operation, for example, tapping or flicking the header region H, pressing a button on the operation unit 24, or shaking the user terminal 20.

The restoration is to return the current state to the state before the at least one of the display mode or the display position of the icon I is changed. Setting the current state to the state exhibited when the display control module 201 displayed the icon I corresponds to the restoration. In the example of FIG. 3, changing the current state from the state of the home screen G4 to the state of the home screen G1 corresponds to the restoration. In the first embodiment, the header region H is also contracted, and hence the restoration module 205 also returns the header region H to the original state.

In a case in which the at least one of the display mode or the display position has been restored by the selection operation of the button B, the display changing module 203 does not change the at least one of the display mode or the display position even when the checking time period elapses again thereafter. In this case, the determination module 202 is not required to again execute the processing for determining whether or not the checking time period has elapsed. When the selection operation of the button B is performed, the at least one of the display mode or the display position of the icon I is changed again.

[1-4. Processing to be Executed in First Embodiment]

Figure 5:
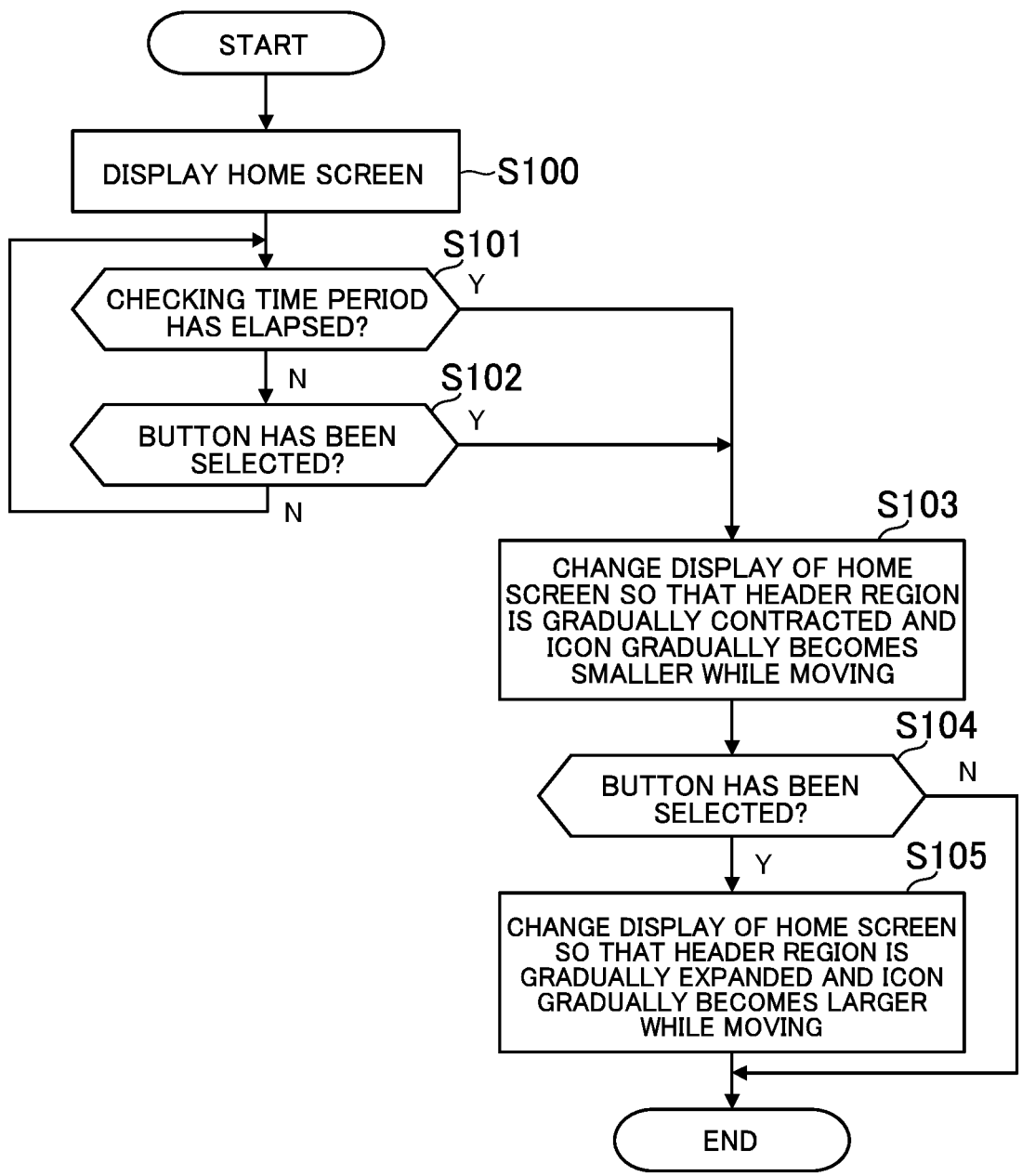
FIG. 5 is a flow chart for illustrating an example of processing to be executed in the first embodiment.

FIG. 5 is a flow chart for illustrating an example of processing to be executed in the first embodiment. The processing illustrated in FIG. 5 is executed by the control unit 21 operating in accordance with the program stored in the storage unit 22. This processing is an example of processing to be executed by the functional blocks illustrated in FIG. 5. This processing is executed when an operation for activating the app of the user terminal 20 is performed.

As illustrated in FIG. 5, the user terminal 20 activates the app, and displays the home screen G on the display unit (Step S100). The user terminal 20 may inquire of the server 10 about information (for example, unread message) required for displaying the home screen G. The user terminal counts the time, and determines whether or not the checking time period has elapsed (Step S101).

In Step S101, when it is not determined that the checking time period has elapsed (N in Step S101), the user terminal determines whether or not the button B has been selected (Step S102). When it is not determined that the button B has been selected (N in Step S102), the process returns to the processing step of Step S101, and the time is counted again. When it is determined that the button B has been selected (Y in Step S102), the process advances to the processing step of Step S103 described later.

When it is determined in Step S101 that the checking time period has elapsed (Y in Step S101), the user terminal changes the display of the home screen G so that the header region H is gradually contracted and the icon I gradually becomes smaller while moving (Step S103). In Step S103, in addition to the animation in the header region H, the user terminal 20 also changes the display region A so that the display region A expands upward. The user terminal 20 stops the animation when the header region H is contracted to a minimum size and the icon I becomes circular and reaches the position of the moving destination.

The user terminal 20 determines whether or not the button B has been selected (Step S104). When it is not determined that the button B has been selected (N in Step S104), this process ends. When it is determined that the button B has been selected (Y in Step S104), the user terminal 20 changes the display of the home screen G so that the header region H is gradually expanded and the icon I gradually becomes larger while moving (Step S105), and this process ends.

In Step S105, an animation reverse to that of Step S103 is executed. Instead of the execution of the reverse animation, the header region H may be instantaneously expanded and the icon I may instantaneously move to become larger. The processing step of Step S101 is not executed after the processing step of Step S105 is executed, and hence the display of the header region H and the display of the icon I are not changed unless the user selects the button B again.

According to the first embodiment, it is possible to provide a highly convenient user interface by changing at least one of the display mode or the display position of at least one icon I when it is determined that the checking time period has elapsed. For example, the user cannot view any information after the icon I is deleted when it is determined that the checking time period has elapsed, but can check minimum information when the icon I is intentionally caused to remain. Further, for example, even when only the display position is changed without changing the display mode of the icon I, the icon I can be automatically moved to an inconspicuous position after the user finishes checking the icon I, and hence it is possible to display another image in place of the moved icon I. In this case, it is assumed that the icon I is not moved out of the home screen G, but at least a part of the icon I remains on the home screen G.

Further, by changing the display mode of the icon I so that at least one icon I becomes smaller when it is determined that the checking time period has elapsed, it is possible to effectively utilize the display space of the home screen G by an amount corresponding to a decrease amount of the icon I. For example, it is possible to display another image in a region that is no longer included in the icon I, and hence it is possible to present useful information without requiring the user to perform any operation.

Further, by changing the display mode of the icon I so that the information amount of at least one icon I is reduced when it is determined that the checking time period has elapsed, it is possible to provide a highly convenient user interface because of preventing the information that has been checked by the user from remaining indefinitely and preventing all the information from disappearing to allow nothing to be checked. It is also possible to effectively utilize the display space of the home screen G by an amount corresponding to a decrease amount of the information amount of the icon I.

Further, by changing the display mode of the icon I so that the number or character included in at least one icon I is erased and the graphic form remains when it is determined that the checking time period has elapsed, it is possible to provide a highly convenient user interface because of preventing the number or character that has been checked by the user from remaining indefinitely and preventing all the information from disappearing to allow nothing to be checked. Further, by intentionally causing the graphic form to remain in the icon I, it is possible to provide maximum information that can be intuitively understood in a minimum space. It is also possible to effectively utilize the display space of the home screen G by an amount corresponding to the erased numbers or characters in the icon I.

Further, when it is determined that the checking time period has elapsed, the header region H in the home screen G is changed so that the header region H is contracted, and at least one of the display mode or the display position of the icon I is changed so that at least one icon I is displayed in a part of the contracted header region H, to thereby be able to effectively utilize the display space of the home screen G by an amount corresponding to a decrease amount of the contracted header region H. Further, by intentionally causing the header region H to remain instead of erasing the entire header region H, it is possible to secure the minimum space for displaying the icon I.

Further, when it is determined that the checking time period has elapsed, the header region H on the home screen G is changed so that the header region H is contracted and no longer includes the position at which the icon I has been displayed so far, and the display position of the icon I is changed so that at least one icon I moves in the direction in which the header region H is contracted and falls within the contracted header region H, to thereby be able to effectively utilize the display space of the home screen G by an amount corresponding to a decrease amount of the contracted header region H. For example, an upper end of the display region A can be extended upward by an amount by which the lower end of the header region H is moved upward, and more content can be displayed.

Further, when it is determined that the checking time period has elapsed, the header region H in the home screen G is changed so that the header region is contracted, and at least one of the display mode or the display position of the icon I is changed so that at least one icon is displayed in a part of the contracted header region H, to thereby be able to effectively utilize the display space of the home screen G by an amount corresponding to a decrease amount of the contracted header region H. Further, even when the header region H is contracted, it is possible to display the icon I therein, and hence the user can be provided with the minimum information.

Further, when the selection operation of the button B is performed after at least one of the display mode or the display position of the icon I is changed, the at least one of the display mode or the display position that has been changed is restored, and in the case in which the at least one of the display mode or the display position is restored by the selection operation of the button B, the at least one of the display mode or the display position of the icon I is not changed even when the checking time period elapses again thereafter. Thus, when the restoration has been performed based on the user's own intention, the display can be performed with a priority being placed on the intention.

Accordingly, it is possible to prevent the header region H from being contracted arbitrarily regardless of the user's intention to keep the header region H expanded, and hence it is possible to effectively enhance convenience of the user.

2. Second Embodiment

Next, a display control system S according to a second embodiment of the present disclosure is described. In the second embodiment, display performed when a scrolling operation is performed on the display region A under the state of the home screen G1 of FIG. 3 is described. The scrolling operation may be any operation as long as the scrolling operation is an operation for scrolling the image. For example, the scrolling operation may be an operation for moving a contact position up and down after touching the screen, or may be an operation for moving a scroll bar on the screen.

In the second embodiment, it is assumed that the display control performed when the checking time period has elapsed, which is described in the first embodiment, is not executed, but when the checking time period has elapsed without the scrolling operation being performed, the same display control as that of the first embodiment may be executed. In the second embodiment, the description of the same components as those of the first embodiment are omitted.

Figure 6:
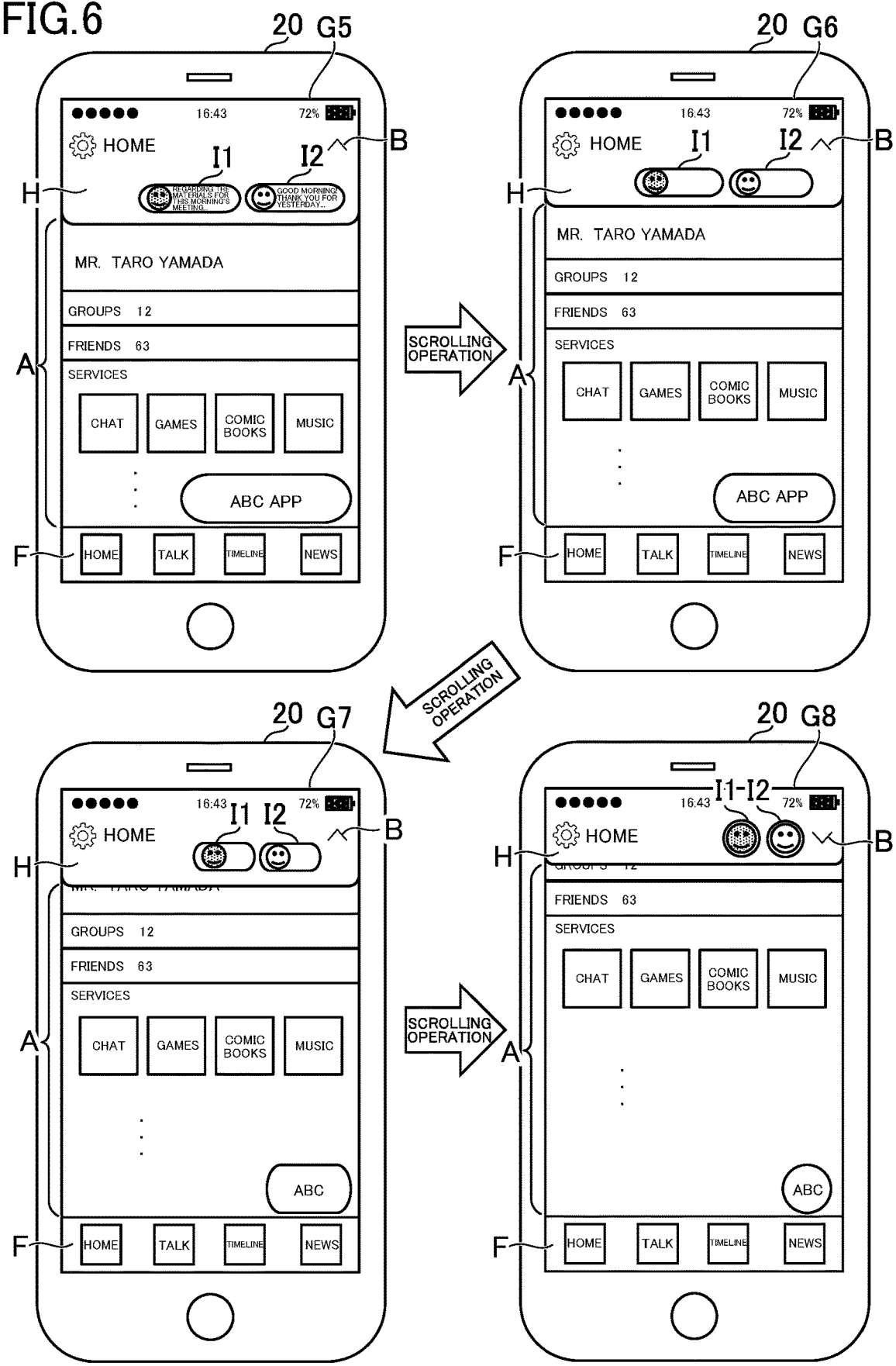
FIG. 6 is a view for illustrating an example of how the home screen is changed in a second embodiment of the present disclosure.

FIG. 6 is a view for illustrating an example of how the home screen G is changed in the second embodiment. As illustrated in FIG. 6, in a case in which the app has been activated to reach a state of a home screen G5, when the user performs the scrolling operation, the header region H is gradually contracted, and the icon I gradually becomes smaller while moving (states of home screens G6 to G8). Changes of the header region H from the home screen G5 to the home screen G8 are the same as the changes from the home screen G1 to the home screen G4 except that the display region A is scrolled by the scrolling operation.

A condition for the header region H or the like to start to be contracted is that the checking time period has elapsed in the first embodiment, but is that the scrolling operation has been performed in the second embodiment. After the state of the home screen G8 is reached, the header region H is not returned to the original state (state of the home screen G5) unless the button B is selected. However, when the scrolling operation in a reverse direction is performed, the header region H may be returned to the original state.

The determination module 202 in the second embodiment determines, when at least one icon I is displayed, whether or not the scrolling operation has been received. The scrolling operation is an example of a predetermined operation. Accordingly, the scrolling operation as used herein can be read as "predetermined operation." The predetermined operation is not limited to the scrolling operation, and may be any operation. For example, the predetermined operation may be tapping on an empty region in the header region H, flicking the header region H upward, or shaking the user terminal 20 in a vertical direction.

The display changing module 203 changes the display mode of at least one icon I so that the information amount of the at least one icon I is reduced when it is determined that the scrolling operation has been received. The meaning of the wording "the information amount is reduced" is as described in the first embodiment. The display changing module 203 changes the display mode so that the information amount of the icon I is reduced on condition that the scrolling operation is received.

Figure 7:
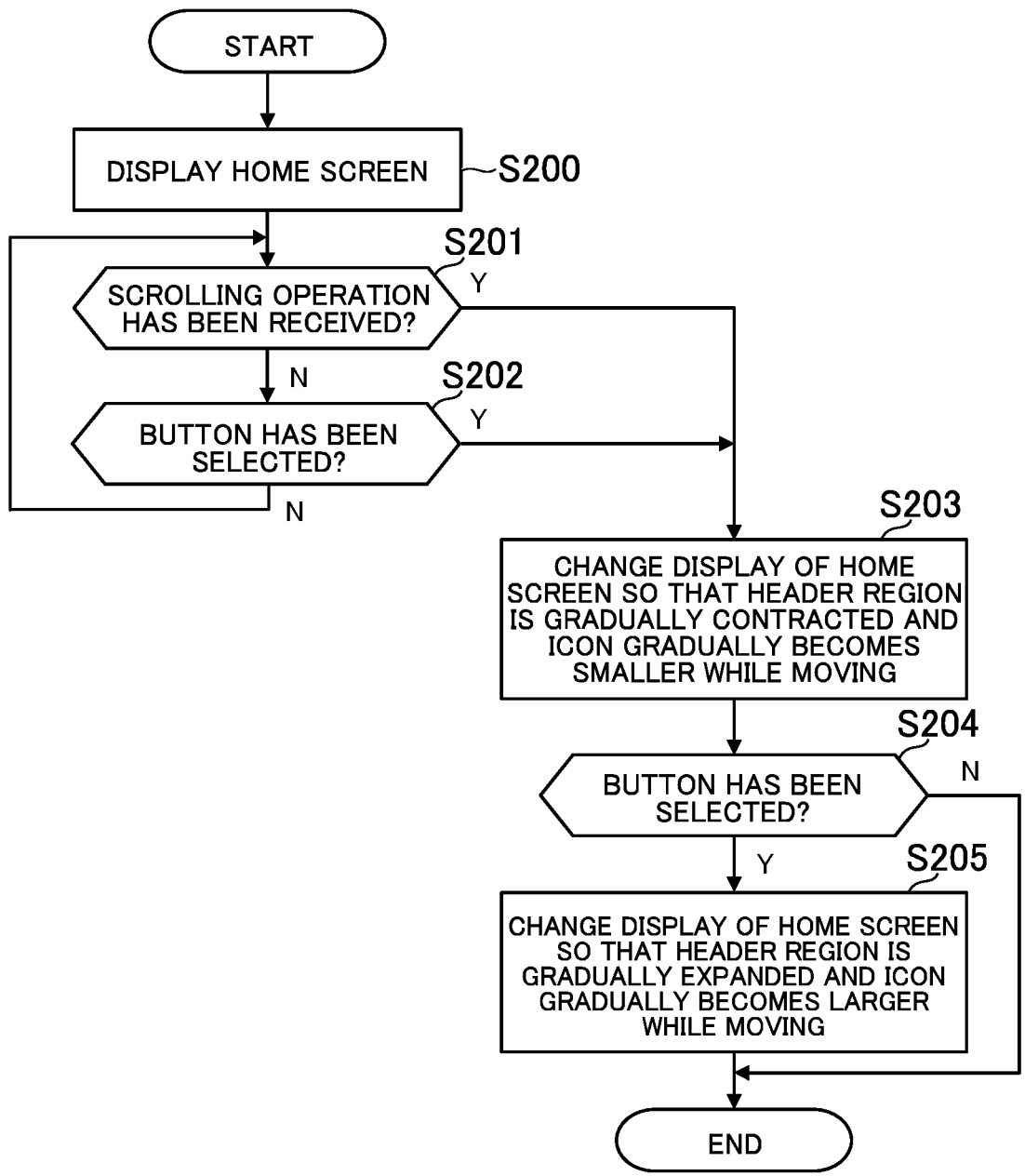
FIG. 7 is a flow chart for illustrating an example of processing to be executed in the second embodiment.

FIG. 7 is a flow chart for illustrating an example of processing to be executed in the second embodiment. As illustrated in FIG. 7, the processing step of Step S200 is the same as that of Step S100. The user terminal 20 determines based on a detection signal of the operation unit 24 whether or not the scrolling operation has been received (Step S201). When it is not determined that the scrolling operation has been received (N in Step S201), the processing step of Step S202 is executed in the same manner as in Step S102.

When it is determined that the scrolling operation has been received (Y in Step S201), the processing step of Step S203 is executed in the same manner as in Step S103. However, in Step S203, the user terminal 20 also executes scrolling in the display region A depending on the scrolling operation. The other processing steps of Step S204 and Step S205 are the same as the processing steps of Step S104 and Step S105.

According to the second embodiment, by changing the display mode of at least one icon I so that the information amount of the at least one icon I is reduced when it is determined that the scrolling operation has been received, it is possible to provide a highly convenient user interface because of preventing the information that has been checked by the user from remaining indefinitely and preventing all the information from disappearing. For example, the user cannot view any information after the icon I is deleted when the scrolling operation is received, but can check the minimum information when the icon I having a reduced information amount is intentionally caused to remain.

3. Modification Examples

The present disclosure is not limited to the embodiments described above, and can be modified suitably without departing from the spirit of the present disclosure. The following description is given of cases in which configurations of the modification examples are applied to the first embodiment, but the configurations of the modification examples may be applied to the second embodiment.

Figure 8:
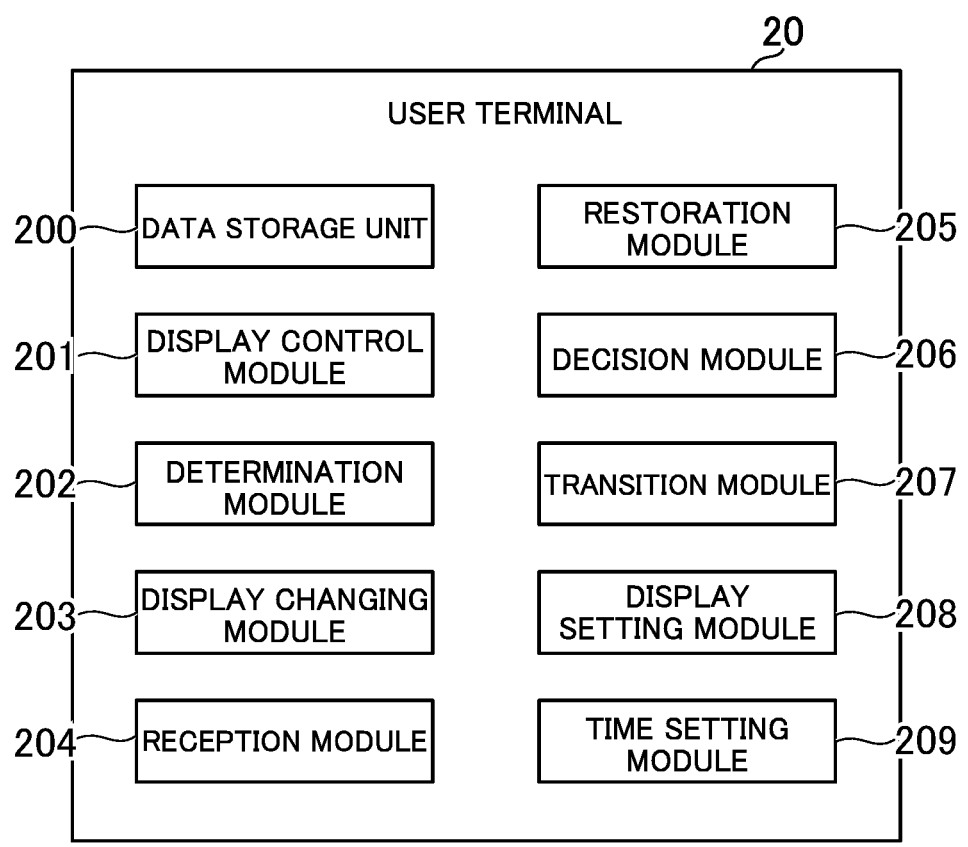
FIG. 8 is a functional block diagram in modification examples of the present disclosure.

FIG. 8 is a functional block diagram in the modification examples. As illustrated in FIG. 8, in the modification examples described below, a decision module 206, a transition module 207, a display setting module 208, and a time setting module 209 are implemented in addition to the functions described in the embodiments. Each of those functions is mainly implemented by the control unit 21.

(1) For example, a number of icons I displayed in the header region H may be variable. The app described in the first embodiment displays, in the header region H, the same number of icons I as a number of unread messages. As the number of unread messages increases, the number of icons I also increases, and hence there is a fear in that the space in the header region H may be insufficient. In view of this, a size of the header region H may be decided based on the number of icons I.

Figure 9:
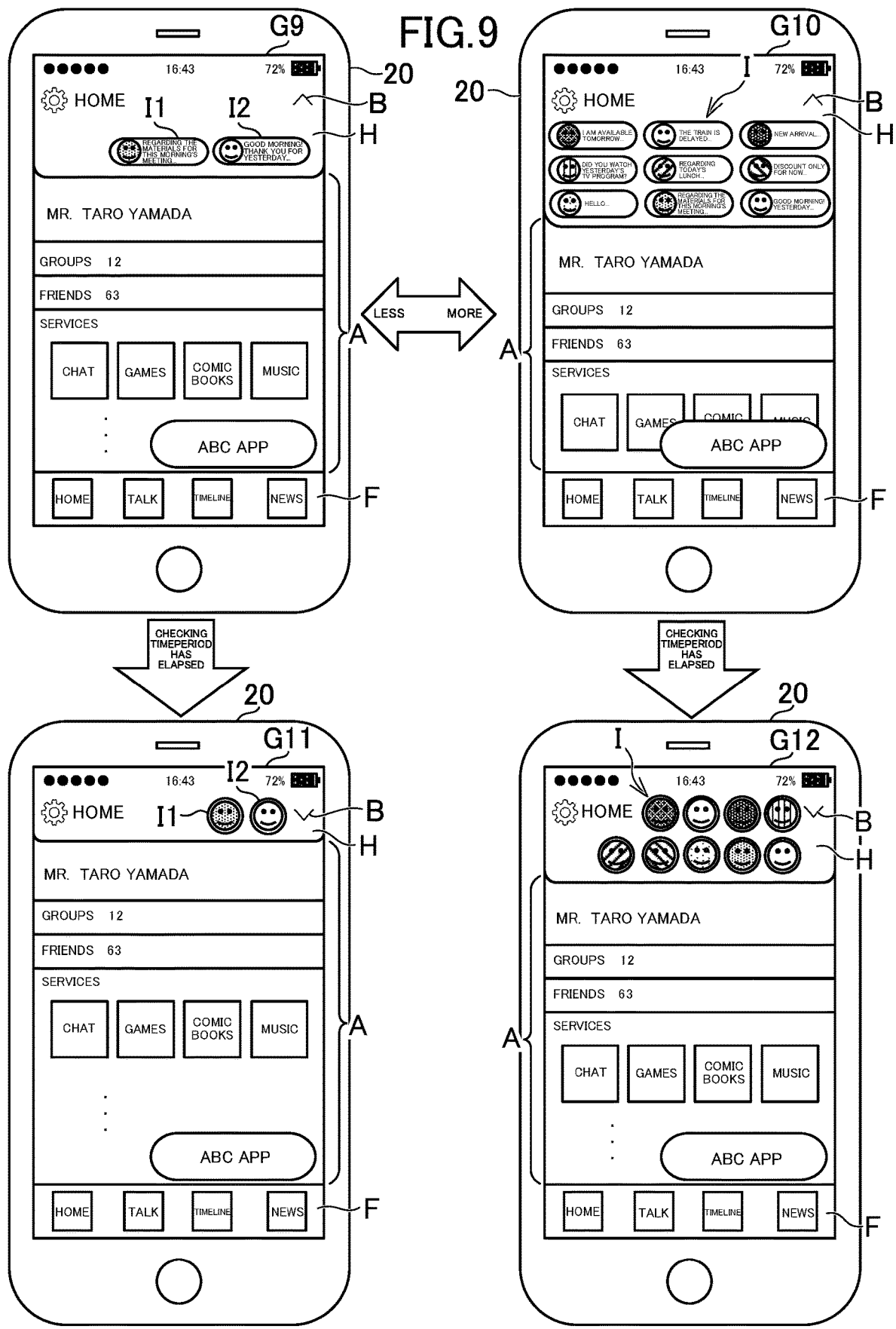
FIG. 9 is a view for illustrating an example of how a size of a header region is changed depending on a number of icons.

FIG. 9 is a view for illustrating an example of how the size of the header region H is changed depending on the number of icons I. In the example of FIG. 9, a state of a home screen G9 having two icons I and a state of a home screen G10 having nine icons I are illustrated. As illustrated in FIG. 9, as the number of icons I becomes larger, the size of the header region H becomes larger. The size of the header region H may become smaller as the number of icons I becomes smaller.

The user terminal 20 in Modification Example (1) of the present disclosure includes the decision module 206. The decision module 206 decides the size of the header region H on the home screen G based on the number of icons I displayed in the header region H. For example, the decision module 206 decides the size of the header region H so that all the icons I or a predetermined number or more of icons I fall within the header region H. It is assumed that a relationship between the number of icons I and the size of the header region H before being contracted is defined in the app. The decision module 206 may decide a size associated with the number of icons I as the size of the header region H before being contracted.

The number of icons I can be identified by any method. For example, the user terminal 20 may inquire of the server about the number of icons I. In this modification example, the number of unread messages is the number of icons I, and hence the user terminal 20 decides the number of icons I by acquiring the number of unread messages from the server 10. In addition, for example, when the app includes information indicating the number of icons I, the user terminal 20 may refer to the information to decide the number of icons I.

The decision module 206 decides, based on the number of icons I displayed in the header region H, the size of the header region H to be displayed after the header region H has been contracted on the home screen G. For example, the decision module 206 decides the size of the header region H after having been contracted so that all the icons I or a predetermined number or more of icons I fall within the header region H after having been contracted.

As the number of icons I becomes larger, the size of the header region H after having been contracted becomes larger (state of a home screen G12 of FIG. 9). As the number of icons I becomes smaller, the size of the header region H after having been contracted becomes smaller (state of a home screen G11 of FIG. 9). It is assumed that a relationship between the number of icons I and the size of the header region H after having been contracted is defined in the app. The decision module 206 may decide a size associated with the number of icons I as the size of the header region H after having been contracted.

The display changing module 203 changes the header region H so that the icons I fall within the header region H after having been contracted based on the size decided by the decision module 206. The display changing module 203 may contract the header region H so that the header region H is contracted to the size decided by the decision module 206. In this case, a time period required for the animation may be fixed and a speed of the animation may be adjusted, or the speed of the animation may be fixed and the time period required for the animation may be adjusted. In another example, the speed and the time required for the animation may be both fixed and may be both adjusted.

According to Modification Example (1), the size of the header region H after having been contracted on the home screen G is decided based on the number of icons I displayed in the header region H, and the header region H is changed so that the icons I fall within the header region H after having been contracted, to thereby be able to provide a more highly convenient user interface. For example, when the number of icons I is large, the header region H having a large size is set so as to enable a larger number of icons I to be checked. Meanwhile, for example, when the number of icons I is small, the header region H having a small size is set so as to enable the space of the home screen G to be effectively utilized.

Figure 10:
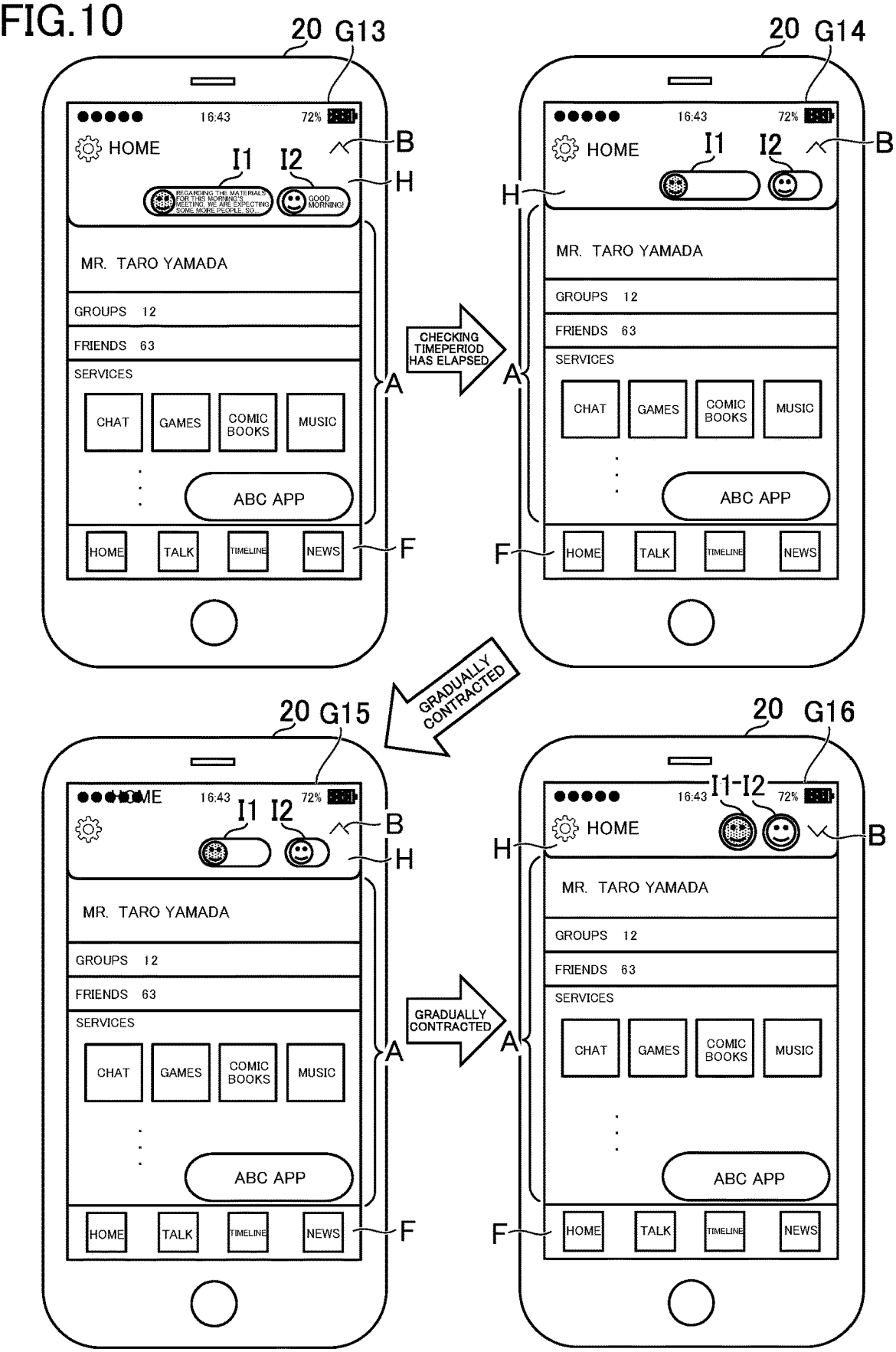
FIG. 10 is a view for illustrating an example of how icons having mutually different sizes are displayed in the header region.

(2) Further, for example, the case in which the sizes of the icons I are the same as each other has been described, but the sizes of the icons I may be different from each other. FIG. 10 is a view for illustrating an example of how the icons I having mutually different sizes are displayed in the header region H. As illustrated in FIG. 10, the display control module 201 may display a plurality of icons I having mutually different sizes on a home screen G13.

For example, as the information amount to be displayed in the icon I becomes larger, the inner size of the icon I becomes larger. As the information amount to be displayed in the icon I becomes smaller, the inner size of the icon I becomes smaller. In the example of FIG. 10, the icon I1 has a larger number of characters, and thus has a larger horizontal width than that of the icon I2. The information amount to be displayed in the icon I is decided by the number of characters or the number of digits of the information to be displayed in the icon I.

When it is determined that the checking time period has elapsed, the display changing module 203 changes the display mode of each of the plurality of icons I so that the sizes of the plurality of icons I are the same as each other. As in states of home screens G14 to G16, a difference in size between the icon I1 and the icon I2 gradually becomes smaller, and finally the icon I1 and the icon I2 have the same size.

According to Modification Example (2) of the present disclosure, when it is determined that the checking time period has elapsed, the display mode of each of the plurality of icons I is changed so that the sizes of the plurality of icons I that have been different from each other become the same as each other, to thereby be able to provide a more highly convenient user interface. For example, when the information amount to be displayed is large, the icon I having a large size is set so as to enable a larger amount of information to be checked. Meanwhile, for example, when the information amount to be displayed is small, the header region H having a small size is set so as to enable the space of the home screen G to be effectively utilized.

(3) Further, for example, after the user activates the app, the app may transition to a background, and a screen different from the home screen G may be displayed. After that, when the user calls back the app again, the home screen G1 may be in the same state as when the app was activated.

The user terminal 20 in Modification Example (3) of the present disclosure includes the transition module 207. The transition module 207 causes the home screen G to transition to the background when a second operation is performed after at least one of the display mode or the display position of the icon I is changed. The second operation is an operation for causing the app to transition to the background. The second operation may be any operation as long as the operation is defined in advance, and is, for example, an operation for flicking upward from a bottom of the home screen G or an operation for pressing a predetermined button of the operation unit 24.

When a third operation is performed after the home screen G transitions to the background, the display control module 201 again displays the home screen G in the state in which the at least one of the display mode or the display position that had been changed has been restored. The third operation is an operation for calling back the app in the background. The third operation is also called "fore operation." Calling back the app by the third operation is also called "foreground." The third operation may be any operation as long as the operation is defined in advance, and is, for example, an operation for selecting an icon of the app itself or an operation for selecting the app to be called back from a list of apps that have transitioned to the background. The restored state is a state exhibited at a time point at which the app was activated. In the example of FIG. 3, restoring the state is changing the state of the home screen G4 to the state of the home screen G1.

When the time period has elapsed since the home screen G was displayed again, the display changing module 203 again changes the at least one of the display mode or the display position. This processing is as described in the first embodiment. The processing described in the first embodiment is executed again.

According to Modification Example (3), when the app is called back after having transitioned to the background, the home screen G in the state in which at least one of the display mode or the display position of the icon I has been restored is displayed again, and the at least one of the display mode or the display position of the icon I is changed again when the checking has elapsed thereafter, to thereby be able to provide a more highly convenient user interface. For example, when a long time period has been required for the user to call back the app after the app transitioned to the background, the user may forget the content of the icon I in the header region H, and the content to be displayed as the icon I may also be changed in the first place. In this case, by displaying again the header region H in an expanded state, it is possible to present effective information to the user without requiring the user to perform the operation for selecting the button B or another special operation.

(4) Further, for example, some users wish to keep the header region H displayed at all times (state of the home screen G1), and some users wish to keep the header region H contracted at all times (state of the home screen G4). Accordingly, a display setting of the header region H to be performed by the user may be enabled.

Figure 11:
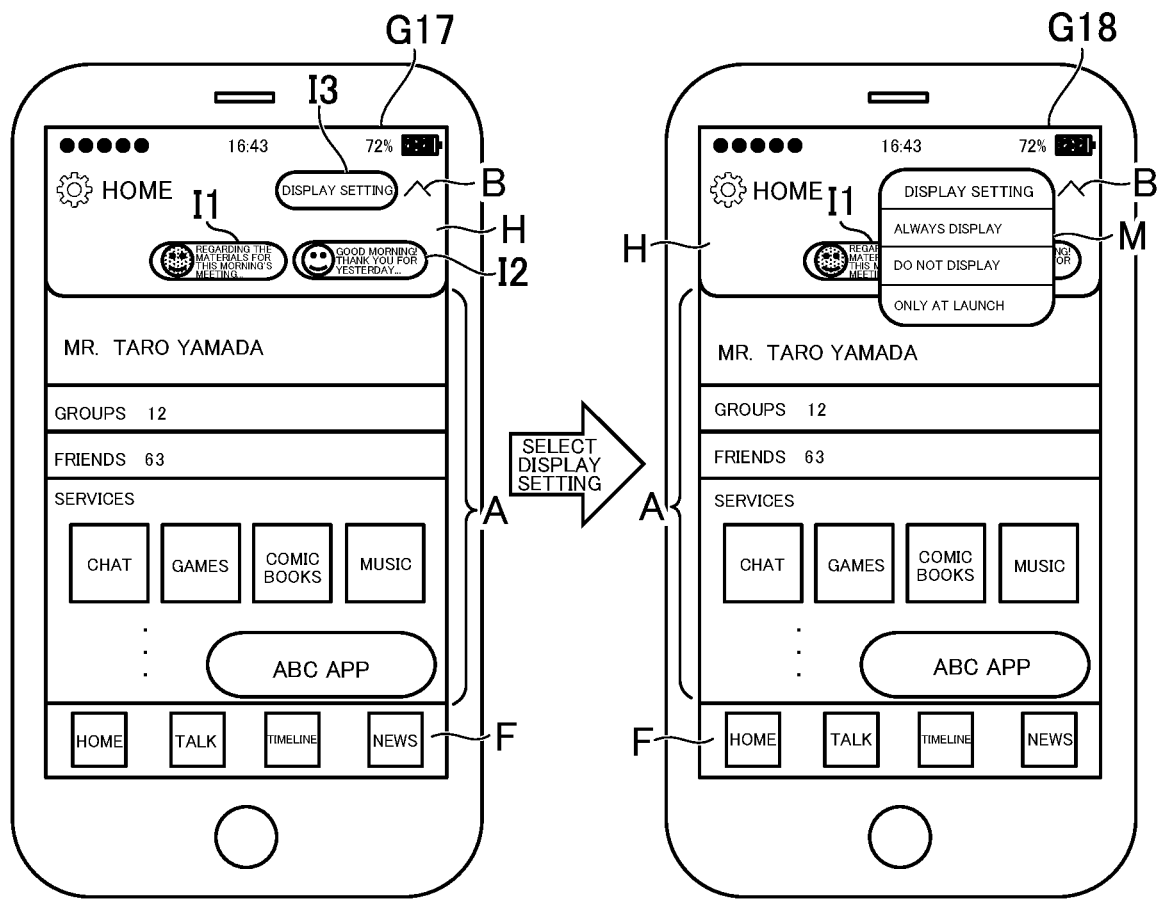
FIG. 11 is a view for illustrating an example of the home screen for which a display setting of the header region is enabled.

FIG. 11 is a view for illustrating an example of the home screen G for which the display setting of the header region H is enabled. As illustrated in FIG. 11, an icon I3 for performing the display setting is displayed in the header region H (state of a home screen G17). When the user selects the icon 13, a menu M is displayed to enable the display setting to be designated (state of a home screen G18).

The user terminal 20 in Modification Example (4) of the present disclosure includes the display setting module 208. The display setting module 208 performs the display setting relating to whether or not to change at least one of the display mode or the display position of the icons I1 and I2 based on the selection operation of the icon 13. The selection operation of the icon 13 is an example of a fourth operation. The fourth operation may be any operation as long as the operation is defined in advance. For example, the fourth operation may be an operation for pressing and holding the header region H or an operation for selecting a button or the like other than the icon 13.

The display changing module 203 decides whether or not to change at least one of the display mode or the display position of the icon I based on the display setting designated by the user. For example, when the user selects "Always display," the display changing module 203 does not contract the header region H and the icon I and does not change the display even after the checking time period has elapsed. In this case, the determination processing of the determination module 202 is not executed as well.

When the user selects "Do not display," the display control module 201 displays the home screen G in a state in which the header region H is contracted from the beginning and the icon I is also small from the beginning (state of the home screen G4). In this case, the display changing module 203 does not change the display of the header region H and the display of the icon I from this state. When the user selects "Only at launch," the same display control as that of the first embodiment is executed.

According to Modification Example (4), it is decided whether or not to change at least one of the display mode or the display position of the icon I based on the display setting designated by the user, to thereby be able to provide a more highly convenient user interface corresponding to a preference of the user.

(5) Further, for example, in a case in which the number of icons I displayed on the home screen G is set variable as in Modification Example (1), when the number of icons I becomes larger, it may require a long time period to check content thereof. In view of this, the checking time period may be set depending on the number of icons I.

The user terminal 20 in Modification Example (5) of the present disclosure includes the time setting module 209. The time setting module 209 sets the length of the checking time period based on the number of icons I displayed on the home screen G. The time setting module 209 sets the length of the checking time period so that the checking time period becomes longer as the number of icons I becomes larger. The time setting module 209 sets the length of the checking time period so that the checking time period becomes shorter as the number of icons I becomes smaller.

It is assumed that a relationship between the number of icons I and the length of the checking time period is defined in the app. The time setting module 209 may set the checking time period having the length associated with the number of icons I. The determination module 202 may determine whether or not the checking time period having the length set by the time setting module 209 has elapsed. This determination method itself is the same as that of the first embodiment except that a method of setting the checking time period differs from that of the first embodiment.

According to Modification Example (5), the length of the checking time period is set based on the number of icons I displayed on the home screen G, to thereby be able to provide a more highly convenient user interface. For example, when the number of icons I is large, a longer checking time period is ensured so as to enable the user to check the icons I without haste. Meanwhile, for example, when the number of icons I is small, a shorter checking time period is ensured so as to enable the state to be quickly changed to a state in which more content is displayed, to thereby enable the space of the home screen G to be effectively utilized.

(6) Further, for example, an example of the screen in the message app has been described, but the display control system S can also be applied to screens of various services including an electronic payment service, an electronic commerce service, an electronic ticket service, a check-in service, a financial service, a communication service, and a social networking service. In this modification example, a case in which the display control system S is applied to the electronic payment service is described.

Figure 12:
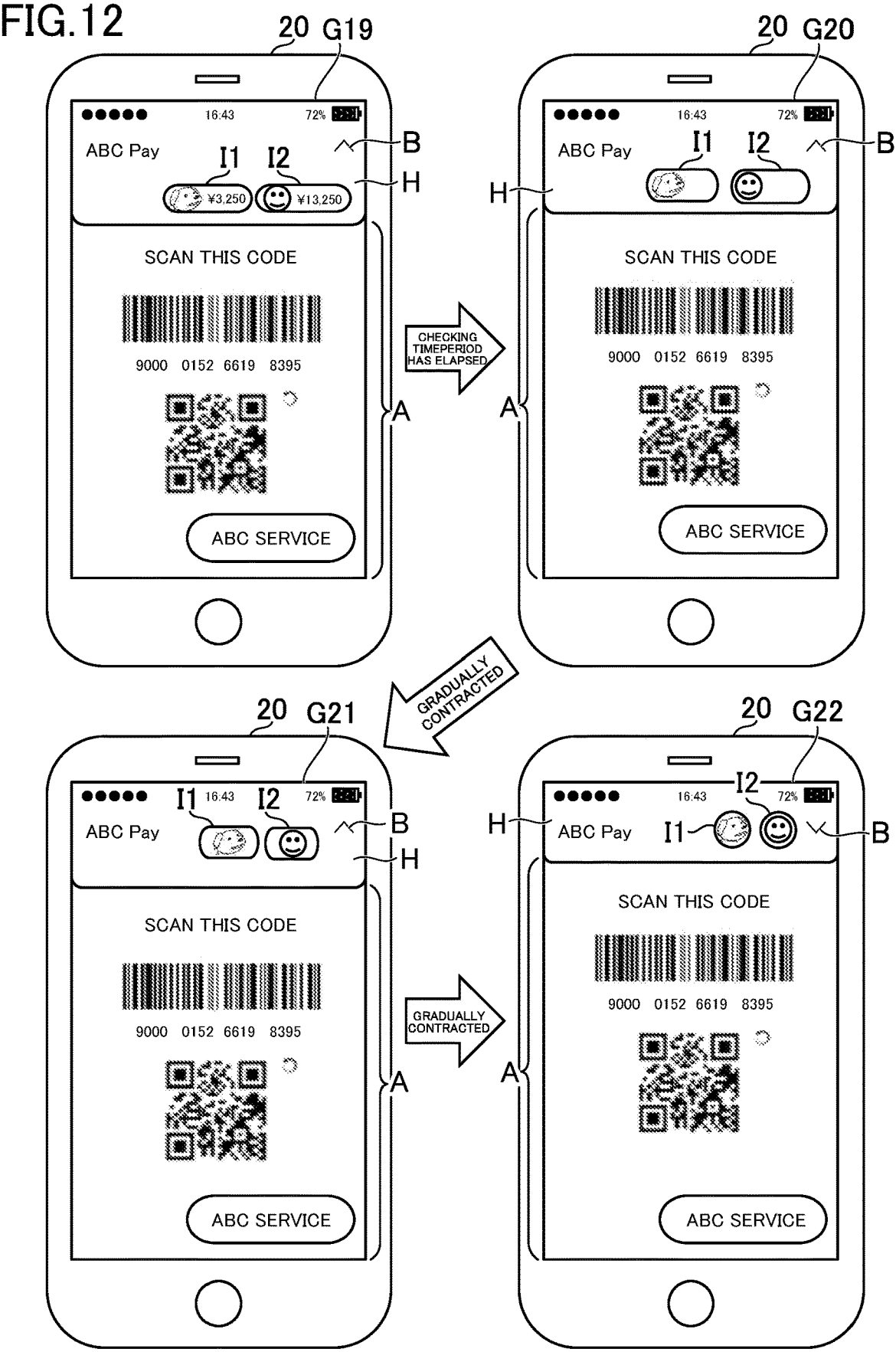
FIG. 12 is a view for illustrating an example of how the home screen is changed in Modification Example (6) of the present disclosure.

FIG. 12 is a view for illustrating an example of how the home screen is changed in Modification Example (6) of the present disclosure. As illustrated in FIG. 12, in the header region H, the icons I each including a graphic form indicating the kind of electronic money and a numerical value indicating a balance of the electronic money are displayed (state of a home screen G19). When the user selects the icon I, the user can use an electronic money service corresponding to the selected icon I (for example, recharge electronic money). Information including the balance of the electronic money may be recorded in the IC chip 26, or may be recorded in the server 10. Payment itself using the electronic money may be executed without activating the app.

The display control module 201 acquires the balance of each kind of electronic money from the server 10 or the IC chip 26 to display the icon I. The determination module 202 determines whether or not the checking time period has elapsed in the same manner as in the first embodiment, and when it is determined that the checking time period has elapsed, the display changing module 203 starts to contract the header region H, and also starts to move the icon I (the state of a home screen G20). In the example of FIG. 12, the balance of the icon I is erased at this time point, but in the same manner as in the first embodiment, the balance may disappear gradually, or may remain as it is until the icon I has become smaller to some extent.

The display changing module 203 gradually contracts the header region H, and gradually reduces the size while moving the icon I (state of a home screen G21). After the header region H is contracted to the smallest state, the display changing module 203 causes the icon I to become circular, and causes only the graphic form of the electronic money to remain (state of a home screen G22). The icon I may have any shape, and is not limited to a circular shape. For example, the icon I may have other shapes, such as an ellipse, a square, or a rectangle.

On the home screen G, it is possible to use not only the electronic money that can be used from the icon I but also electronic payment using a code displayed in the display region A. For example, the user can perform an electronic payment through use of a credit card registered in advance. Further, for example, the user can perform an electronic payment through use of points or cash owned by the user himself or herself. In this case, it is assumed that the server 10 or the IC chip 26 stores information on the credit card, information on the points, or information on the cash.

For example, the user selects a credit card to be used for payment, and causes a bar code or a two-dimensional code to be displayed on the user terminal 20 and to be read by a clerk using a reader at a shop, to thereby execute the payment using the credit card. In another case, for example, when a camera of the user terminal 20 reads a bar code or a two-dimensional code provided by the shop, payment using a credit card selected by the user is executed. The payment method is not limited to those examples. For example, the payment using the registered credit card may be executed without particularly using a code.

According to Modification Example (6), in the electronic payment service, the display space of the home screen G can be effectively utilized while maintaining the convenience of the user. In addition, the user may show the home screen G to another person at a time of payment, but may not wish the balance displayed on the icon I to be viewed by another person. Accordingly, it is possible to prevent the balance from being viewed by another person by automatically erasing the balance after the user checks the balance in the icon I.

When the code is not displayed after the display region A is scrolled, an icon for returning to a position of the code may be displayed. In addition, for the user who has not yet linked the app and the electronic money to each other, text such as "Start" may be displayed in the icon I. In this case, when the user selects the icon I, a screen for linking the app and the electronic money to each other is displayed. In addition, when the icon I including the text "Start" becomes smaller, it may be notified by a red badge or the like that the electronic money has not yet been linked. Further, for example, the user terminal 20 that does not support the electronic money is not required to display the icon I itself. In this case, the header region A may be in a contracted state when the app is activated.

Further, for example, when the user terminal 20 includes a vibrator, the user terminal 20 may be vibrated when the user performs a setting to use the electronic money. Further, when it has been selected which of a plurality of kinds of electronic money is to be used for the payment, the user terminal 20 may be vibrated more strongly. Further, for example, the balance in the icon I may be updated periodically. Further, for example, the icon I is not limited to an icon of electronic money, and may be an icon of another electronic value such as the points. Further, for example, a link to another website such as a bank website may be embedded in the icon I.

(7) Further, for example, the modification examples described above may be combined.

Further, for example, the header region H may not be contracted even when the checking time period has elapsed or the scrolling operation has been performed. In this case, only the icon I may become smaller. Meanwhile, the header region H may be contracted without changing the size or the position of the icon I. Further, for example, the case in which the main functions are implemented by the user terminal has been described, but each function may be implemented by the server 10. Each function may be implemented by another computer other than the server 10 and the user terminal 20, or may be shared by a plurality of computers.

The invention claimed is:

1. A display control device, comprising at least one processor configured to:
    display at least one icon on a part of a header region of a display screen;
    determine, when the at least one icon is displayed, whether a predetermined time period has elapsed;
    change, based on determining when the predetermined time period has elapsed, a display mode of the at least one icon so that the at least one icon becomes smaller,
    change, based on determining when the predetermined time period has elapsed, the header region so that the header region is contracted with the at least one icon,
    change a display position of the at least one icon so that the at least one icon is displayed in a part of the contracted header region;
    wherein the header region comprises an area of the display screen that expands from a top of the display screen;
    display a plurality of icons simultaneously in the header region having mutually different sizes on the display screen, and
    change, based on determining when the predetermined time period has elapsed, the display mode of each of the plurality of icons so that sizes of the plurality of icons are the same as each other.

2. The display control device according to claim 1, wherein the at least one processor is configured to:
    display the at least one icon at a predetermined position in the header region,
    change, based on determining when the predetermined time period has elapsed, the header region so that the header region on the display screen excludes the predetermined position; and
    change the display position so that the at least one icon moves in a direction in which the header region is contracted and falls within the contracted header region.

3. The display control device according to claim 1, wherein a number of icons to be displayed in the header region is variable,
    wherein the at least one processor is configured to decide, based on the number of icons to be displayed in the header region, a size of the header region after having been contracted on the display screen, and change, based on the decided size, the header region so that the at least one icon falls within the header region after having been contracted.

4. The display control device according to claim 1, wherein the at least one processor is configured to:
    restore the display mode that has been changed when a first operation is performed after the display mode is changed, and
    avoid changing the display mode even when the predetermined time period elapses again after the restoration when the display mode has been restored by the first operation.

5. The display control device according to claim 1, wherein the at least one processor is configured to:
    transition the display screen to a background when a second operation is performed after the display mode is changed,
    again display, when a third operation is performed after the display screen transitions to the background, the display screen in a state in which the display mode that had been changed has been restored, and
    again change, when the predetermined time period has elapsed since the display screen was displayed again, the display mode.

6. The display control device according to claim 1, wherein the at least one processor is configured to:
    perform a display setting relating to whether to change the display mode based on a fourth operation, and
    decide whether to change the display mode based on the display setting.

7. The display control device according to claim 1, wherein a number of icons to be displayed on the display screen is variable, and
    wherein the at least one processor is configured to set a length of the predetermined time period based on the number of icons to be displayed on the display screen.

8. The display control device according to claim 1, wherein the header region extends from one of a side of the display screen to an other side of the display screen.

9. The display control device according to claim 1, wherein the header region is still displayed after the contraction is complete.

10. The display control device according to claim 1, wherein the header region comprises at least one of a battery level indicator and a time indicator.

11. The display control device according to claim 1, wherein the at least one processor is configured to change, based on determining when the predetermined time period has elapsed, the display mode so that an information amount of the at least one icon is reduced.

12. The display control device according to claim 11, wherein the at least one icon includes a graphic form and a number or a character, and
    wherein the at least one processor is configured to change, based on determining when the predetermined time period has elapsed, the display mode so that the number or the character included in the at least one icon is erased and the graphic form remains.

13. A display control method, comprising:
    displaying at least one icon on a part of a header region of a display screen;
    determining, when the at least one icon is displayed, whether a predetermined time period has elapsed;
    changing, based on determining when the predetermined time period has elapsed, a display mode of the at least one icon so that the at least one icon becomes smaller;

changing, based on determining when the predetermined time period has elapsed, the header region so that the header region is contracted with the at least one icon, changing a display position of the at least one icon so that the at least one icon is displayed in a part of the contracted header region;

wherein the header region comprises an area of the display screen that expands from a top of the display screen;

displaying a plurality of icons simultaneously in the header region having mutually different sizes on the display screen, and changing, based on determining when the predetermined time period has elapsed, the display mode of each of the plurality of icons so that sizes of the plurality of icons are the same as each other.

14. A non-transitory computer-readable information storage medium for storing a program for causing a computer to:

display at least one icon on a part of a header region of a display screen;

determine, when the at least one icon is displayed, whether a predetermined time period has elapsed;

change, based on determining when the predetermined time period has elapsed, a display mode of the at least one icon so that the at least one icon becomes smaller;

change, based on determining when the predetermined time period has elapsed, the header region so that the header region is contracted with the at least one icon, change a display position of the at least one icon so that the at least one icon is displayed in a part of the contracted header region;

wherein the header region comprises an area of the display screen that expands from a top of the display screen;

display a plurality of icons simultaneously in the header region having mutually different sizes on the display screen, and change, based on determining when the predetermined time period has elapsed, the display mode of each of the plurality of icons so that sizes of the plurality of icons are the same as each other.

* * * * *